(12) United States Patent
Kang et al.

(10) Patent No.: US 7,310,161 B2
(45) Date of Patent: Dec. 18, 2007

(54) COMBINED FLAT BED SCANNER/PRINTER MACHINE

(75) Inventors: Sung-wook Kang, Seoul (KR); Seung-jae Lee, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 442 days.

(21) Appl. No.: 10/671,610

(22) Filed: Sep. 29, 2003

(65) Prior Publication Data

US 2004/0061727 A1   Apr. 1, 2004

(30) Foreign Application Priority Data

Sep. 27, 2002  (KR) .................. 10-2002-0058812
May 29, 2003  (KR) .................. 10-2003-0034539

(51) Int. Cl.
*G06F 3/12*  (2006.01)
*G06F 15/00*  (2006.01)
*G06K 1/00*  (2006.01)

(52) U.S. Cl. .................. 358/1.15; 358/1.12; 358/472; 358/494; 358/497; 347/3; 347/4; 400/82; 400/323

(58) Field of Classification Search ............... 358/1.12, 358/497, 472, 494, 296; 347/3–4; 400/323, 400/82, 625
See application file for complete search history.

(56) References Cited

U.S. PATENT DOCUMENTS 5,567,068 A * 10/1996 Egashira et al. ............ 400/625
6,414,760 B1 * 7/2002 Lopez et al. ................ 358/484
6,519,047 B1 * 2/2003 Ahn .......................... 358/1.12

FOREIGN PATENT DOCUMENTS

JP                08324807 A  * 12/1996

* cited by examiner

*Primary Examiner*—Twyler Lamb
*Assistant Examiner*—Yixing Qin
(74) *Attorney, Agent, or Firm*—Staas & Halsey LLP

(57) ABSTRACT

A combined flat bed scanner/printer machine having: a moving body; a scan module connected to the moving body to read a document; and a recording head connected to the moving body adjacent to the scan module, to print on a paper. The moving body is moved by a moving body transfer unit made up of a belt to which the moving body is secured, a guide rod to guide the moving body, and a motor to move the belt.

32 Claims, 13 Drawing Sheets

US 7,310,161 B2

1

COMBINED FLAT BED SCANNER/PRINTER MACHINE

CROSS-REFERENCE TO RELATED APPLICATIONS

This application claims the benefit of Korean Patent Application No. 2002-58812, filed Sep. 27, 2002, and Korean Patent Application No. 2003-34539, filed May 29, 2003, in the Korean Intellectual Property Office, the disclosures of which are incorporated herein by reference.

BACKGROUND OF THE INVENTION

1. Field of the Invention

The present invention relates to an image forming apparatus, such as a photocopier, a printer, and a scanner, and more particularly, to a multi-function machine that performs functions of a printer and a scanner through a single apparatus.

2. Description of the Related Art

The term "multi-function machine" refers to an apparatus that brings together in a single unit, image forming apparatus functions of photocopying, printing, and scanning. Recently, a multi-function machine has been developed that integrates functions of a flat bed scanner, performing a scanning of a first paper, such as a document, placed on a glass plate, and an ink jet printer, printing an image on a second paper 1 fed from a paper feeding section.

One example of a combined flat bed scanner/printer machine according to the related art is shown in FIG. 1.

Referring to FIG. 1, the combined flat bed scanner/printer machine has a scan section 10, a printer section 20, a paper feeding section 30 and a paper discharging section 40.

The scan section 10 includes a scan unit 11, a scan guide rod 18, and a scan belt 16. The scan unit 11 has a scan module 12, reading a content of the first paper laid on a top surface of a glass plate 14, and a scan frame 13, supporting and moving the scan module 12. The scan belt 16 is connected to the scan frame 13, and transfers the scan unit 11 left and right. The scan belt 16 is driven by a scan motor which is not shown. The scan guide rod 18 guides the scan frame 13.

The printer section 20 includes a recording head 21, a moving belt 26, and a moving guide rod 28. The recording head 21 has a recording frame 23, which is assembled to the moving guide rod 28 and moved left and right along the moving guide rod 28 by the moving belt 26, and an ink jet head 22, which is received within the recording frame 23 and ejects ink. The moving belt 26 is connected to the recording frame 23, and is supplied with power from a moving motor (not shown), thereby moving the recording frame 23 left and right. The guide rod 28 guides the movement of the recording frame 23, so that the recording frame 23 is stably moved left and right by the moving belt 26.

The construction of the paper feeding section 30 is substantially similar to that of a paper feeding section of a common ink jet printer. The paper feeding section 30 includes a paper loading section 32, a pickup roller 34, a feed roller 36, and a paper guide 29.

The paper discharging section 40 includes a paper discharging roller 42, and a star wheel 44, in a construction substantially similar to a paper discharging section of a common ink jet printer.

2

The following is a description of the operation of the combined flat bed scanner/printer machine having the above construction.

When the combined machine is used as a scanner, the first paper is laid on the glass plate 14, and the scan motor (not shown) rotates and turns the scan belt 16. When the scan belt 16 is turned, the scan unit 11 reads the content of the first paper, while moving along the scan guide rod 18, along an axis (Y axis) perpendicular to a recording paper feeding axis (X axis).

When the machine is used as a printer, the second paper 1 is loaded in the paper loading section 32, and separated and fed to the feed roller 36 by the pickup roller 34. The second paper 1 transferred to the feed roller 36 is fed between the recording head 21 and the paper guide 29 at a predetermined interval by the feed roller 36. Then, the moving motor (not shown) rotates and turns the moving belt 26. When the moving belt 26 turns, the ink jet head 22 ejects ink onto the paper 1, while the recording head 21 moves along the moving guide rod 28. When the printing is complete, the second paper 1 is discharged out of the combined machine by the paper discharging roller 42 and the star wheel 44.

Thus, the combined flat bed scanner/printer machine is able to perform printing and scanning as needed.

Because such a combined flat bed scanner/printer machine is merely a combination of a flat bed scanner and an ink jet printer, it is large and needs a number of components.

In other words, the combined machine of the related art has the following disadvantages:

1) because the form of the combined machine is merely a flat bed scanner laid on an ink jet printer, the volume the machine occupies is large;

2) there are redundant mechanical elements; and 3) because there are separate motors for operating the scan unit and the ink jet head, the material costs are increased.

SUMMARY OF THE INVENTION

Accordingly, the present invention solves the above-mentioned and/or other problems occurring in the related art, and an aspect of the present invention provides a combined flat bed scanner/printer machine in which components are reduced in number. Thus, a compactness of a product can be realized and a structure of the product can be simplified.

To achieve the above and/or other aspects, a combined flat bed scanner/printer machine is provided with: a combined flat bed scanner/printer machine comprising: a moving body that is movable, a scan unit, moved by the moving body to scan a first paper, and a print unit, moved by the moving body to print on a second paper.

According to one aspect, the print unit is an ink jet head.

According to one aspect, the scanning and printing occur simultaneously.

According to one aspect, the scan unit and the print unit are mounted on the moving body.

According to one aspect, the machine additionally has a transfer unit, to move the moving body, the transfer unit having a belt, attached to the moving body, a motor, to move the belt, and a guide rod to guide the moving body.

According to one aspect, the machine additionally has a plurality of pulleys to move the moving body along the guide rod, wherein one of the plurality of pulleys is located at an end of the transfer unit and is in communication with the belt, and one of the plurality of pulleys is located at the motor and is in communication with the belt.

According to one aspect, the machine additionally has a connecting unit, wherein the print unit is mounted on the moving body, and the scan unit is selectively mounted on the moving body by the connecting unit to scan the first paper.

According to one aspect, the connecting unit has an electromagnet connected to one of the print unit and the scan unit, and an adsorption plate connected to the remaining one of the print unit and the scan unit to correspond to the electromagnet, wherein the adsorption plate adheres to the electromagnet when the electromagnet is magnetized.

According to one aspect, the connecting unit has a toggle latch connected to one of the print unit and the scan unit, and a locking projection connected to the remaining one of the print unit and the scan unit, wherein the toggle latch is opened when the print unit and the scan unit are not connected, and the toggle latch is closed around the locking projection when the print unit and the scan unit are connected.

According to one aspect the machine additionally has a scan recess, located at an end of the machine and shaped to park the scan unit when the scan unit is not mounted on the moving body.

According to one aspect, the connecting unit has: a latching projection protruding from one of the moving body and the scan unit; a pivoting member pivotably disposed on the remaining one of the moving body and the scan unit, and having a hook to selectively engage the latching projection when the pivoting member pivots; and a moving unit disposed on a conveyance path of the moving body and pivoting the pivoting member to disengage the hook from the latching projection to print the second paper.

According to one aspect, the machine additionally has a sensor determining whether the print unit and the scan unit is mounted on the moving body, wherein the moving body starts moving to read the first paper for the scanning and/or print on the second paper after it is detected whether the scan unit is mounted on the moving body.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings, in which.

DETAILED DESCRIPTION

Figure 1:
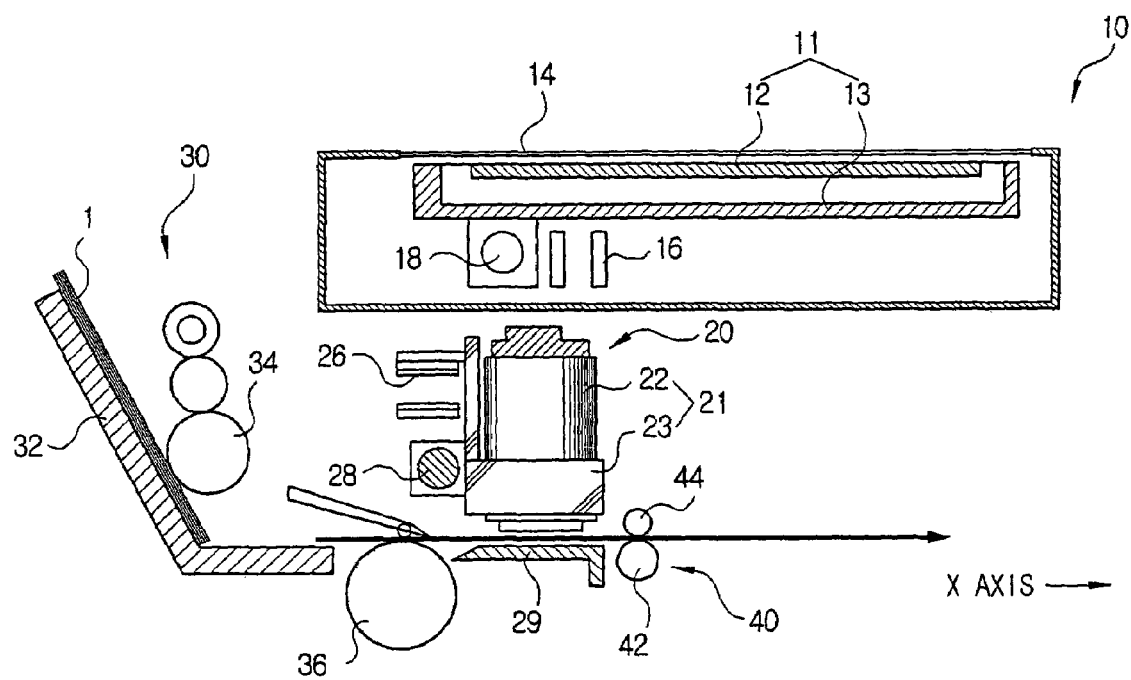
FIG. 1 is a schematic view of a combined flat bed scanner/printer machine according to the related art.

Reference will now made in detail to the embodiments of the present invention, examples of which are illustrated in the accompanying drawings, wherein like reference numerals refer to the like elements throughout. The embodiments are described below to explain the present invention by referring to the figures.

Figure 2:
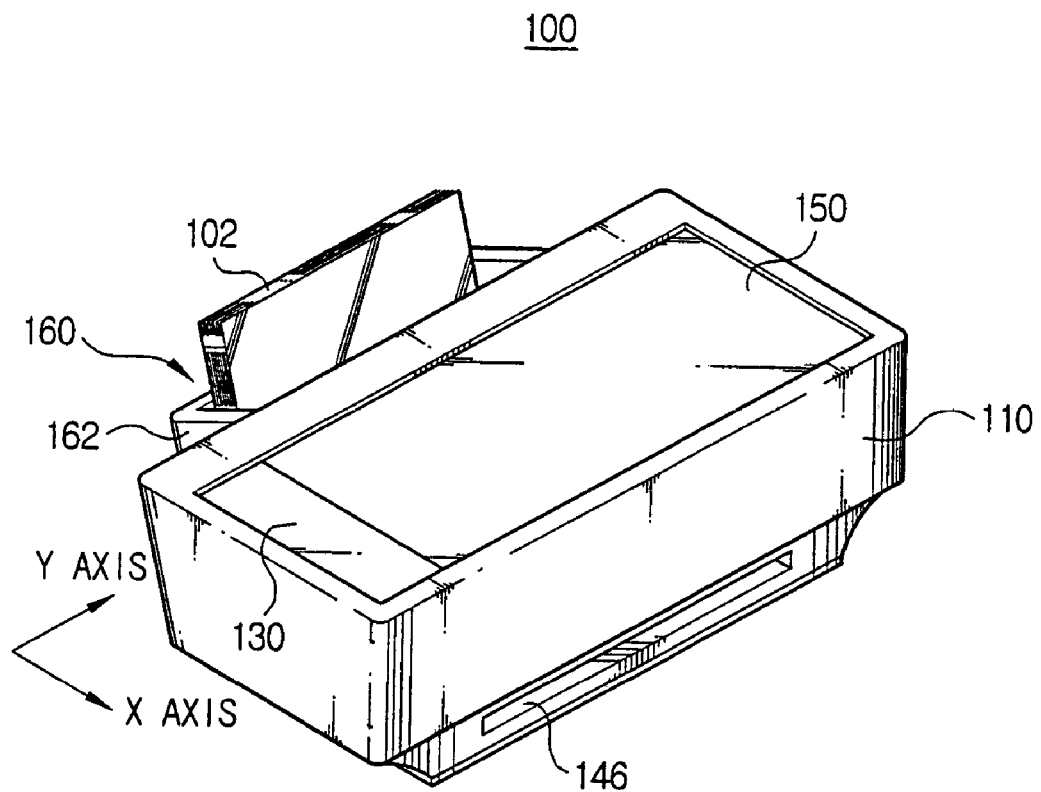
FIG. 2 is a perspective view showing an appearance of a combined flat bed scanner/printer machine according to a first embodiment of the present invention.
Figure 3:
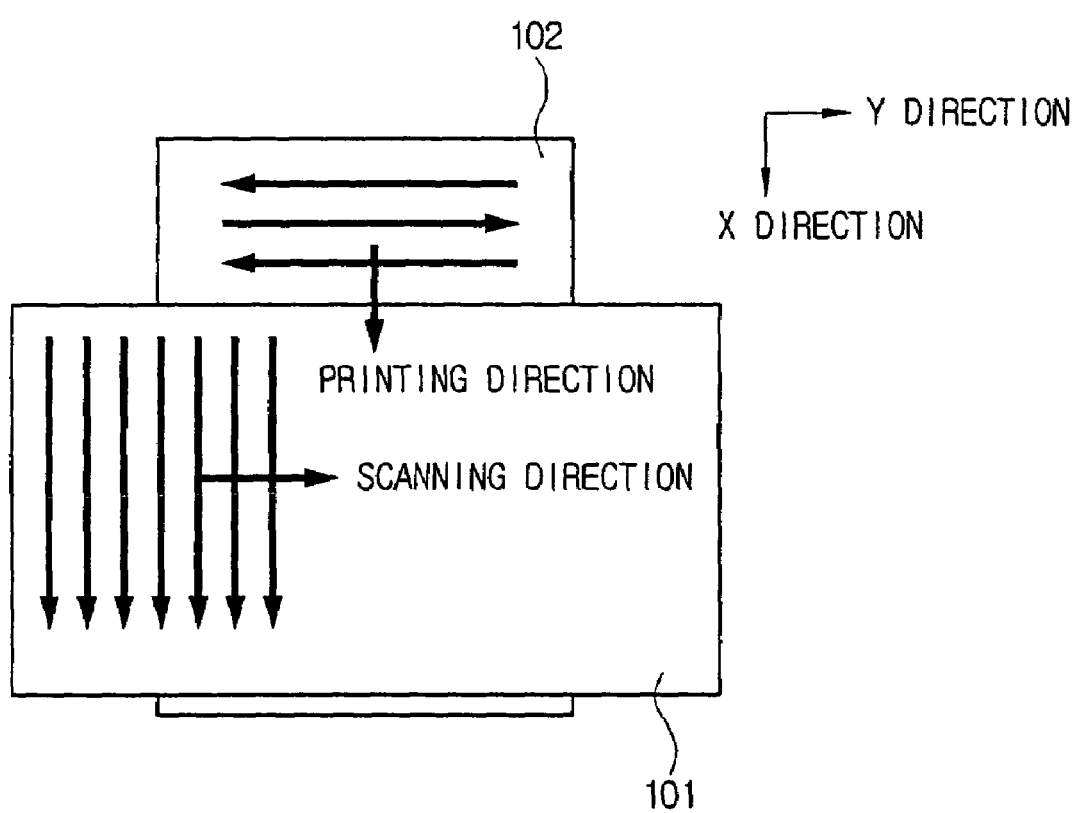
FIG. 3 is a schematic view showing the print direction and the scan direction in the combined flat bed scanner/printer machine of FIG. 2.
Figure 4:
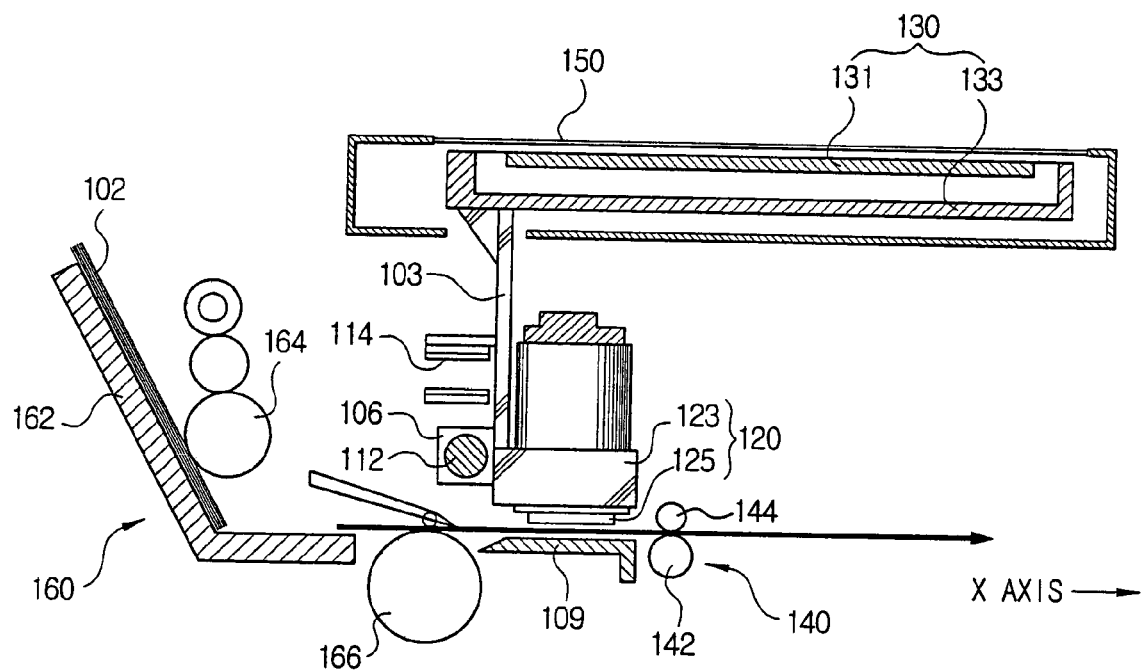
FIG. 4 is a schematic view showing an interior of the combined flat bed scanner/printer machine of FIG. 2.

Referring to FIGS. 2 to 4, a combined flat bed scanner/printer machine 100 according to a first embodiment of the present invention has a moving body 103, a print unit 120, a scan unit 130, a belt 114, a guide rod 112, a paper feeding section 160, and a paper discharging section 140.

The print unit 120 has a recording head 125, and a head section 123 accommodating the recording head 125. The scan unit 130 has a scan module 131, and a scan module section 133 assembled with the scan module 131. The head section 123 and the scan module section 133 are integrally formed with each other via the moving body 103. The moving body 103 has a guide rod section 106, into which the guide rod 112 is inserted. Accordingly, the scan module 131 reads a content of a first paper 101 when the print unit 120 moves back and forth along an axis (Y axis: Refer to FIG. 2) perpendicular to the feeding direction of a second paper 102 (X axis: Refer to FIG. 4). According to one aspect, the scan module 131 is a line scanner having a plurality of image sensors using light detection, e.g., CCD (Charged Coupled Devices) or CIS (Contact Image Sensors), or the like, which read the content of the first paper 101.

The guide rod section 106 is provided with a bushing, so that the moving body 103 smoothly moves along the guide rod 112. The recording head 125 prints on second paper 102, and according to one aspect, employs an ink jet head. A paper guide 109 is provided below the recording head 125 to support the second paper 102 while the second paper 102 is being printed.

The belt 114 translates the moving body 103 along the Y axis. The belt 114 is connected to the moving body 103. There are end pulleys 115 (see FIG. 5) provided at ends of the belt 114, and one end pulley 115 is connected to a motor 116 (see FIG. 5).

The guide rod 112 is provided along the Y axis, and allows the moving body 103 to be stably moved by the belt 114.

The paper feeding section 160 is substantially similar to a paper feeding section of a common ink jet printer. The paper feeding section 160 has a paper loading section 162 loaded with a plurality of second paper sheets 102, a pickup roller 164 separating and feeding the second paper 102 by individual sheets, and a feed roller 166 feeding the second paper 102 under the recording head 125 at a predetermined interval.

The paper discharging section 140 is substantially similar to a paper discharging section of a common ink jet printer. The paper discharging section 140 has a paper discharging roller 142 discharging printed second paper 102 from the machine, and a star wheel 144.

Reference will now be made to the operation of the first embodiment of the combined flat bed scanner/printer machine with reference to the accompanying drawings.

First, when the combined machine 100 is used as a scanner, the first paper 101 is laid and aligned on a glass plate 150. Then, a motor 116 (see FIG. 5) rotates and the belt 114 is moved along the Y axis by the end pulley 115 (see FIG. 5) connected to the motor. The movement of the belt 114 induces the moving body 103, connected to the belt 114, to move along the guide rod 112. As the moving body 103 moves along the guide rod 112, the scan module 131 sequentially reads the content of the first paper 101 laid on the glass plate 150 (see FIG. 3).

When the combined machine 100 is used as a printer, the paper loading section 162 is first loaded with the second paper 102. The second paper 102 loaded in the paper loading section 162 is separated by the pickup roller 164 into individual sheets, and fed into the feed roller 166. The feed roller 166 feeds the second paper 102 between the recording head 125 and the paper guide 109 at a predetermined interval. Then, the motor 116 (see FIG. 5) rotates, and the belt 114 is moved along the Y axis by the pulley 115 connected to the motor. The movement of the belt 114 induces the moving body 103, connected to the belt 114, to move along the guide rod 112. When the moving body 103 moves along the guide rod 112, the recording head 125, in this embodiment the ink jet head, ejects ink onto the second paper 102, which is guided by the paper guide 109 (see the print direction of FIG. 3).

Printing is accomplished in discrete, successive bands of predetermined width, by successive passes of the recording head 125 across the second paper 102. Following a pass of the recording head 125, the feed roller 166 rotates, and advances the second paper 102 toward the paper discharging roller 142 by a predetermined increment that corresponds to the print width of the recording head 125. The recording head 125 pass followed by the incremental second paper 102 movement continues until printing on an individual sheet of second paper 102 is completed. Then, the feed roller 166 rotates and advances the second paper 102 into the paper discharging section 140.

When printing of a sheet of second paper 102 is complete, the second paper 102 is discharged out of the combined flat bed scanner/printer machine 100 by the paper discharging section 140. The second paper 102 that entered the paper discharging section 140 is discharged outwardly through a discharging port 146 by the paper discharging roller 142 and the star wheel 144.

Figure 5:
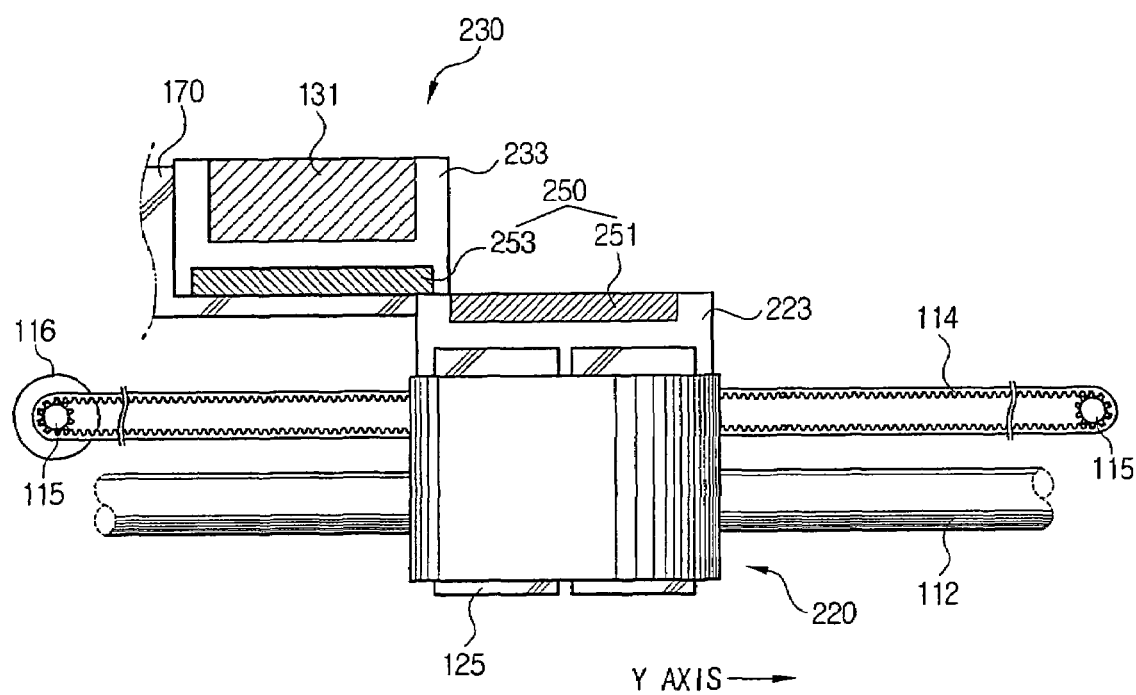
FIG. 5 is a schematic view of the combined flat bed scanner/printer machine according to a second embodiment of the present invention.
Figure 6:
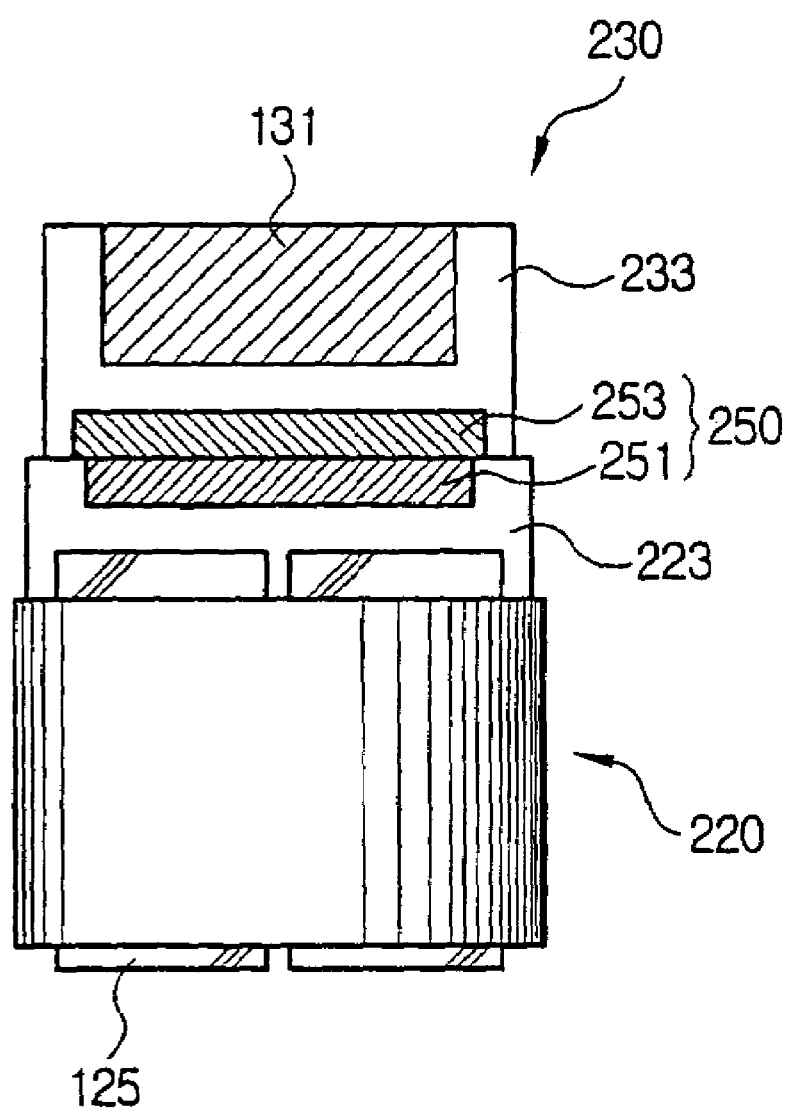
FIG. 6 is a schematic view showing the scan unit and the recording head integrated with each other in the combined flat bed scanner/printer machine of FIG. 5.

FIGS. 5 and 6 show the combined flat bed scanner/printer machine 100 (hereinafter referred to as the combined machine 100), according to a second embodiment of the present invention. The general construction of the second embodiment of the combined machine is substantially the same as that of the combined flat bed scanner/printer machine 100 according to the first embodiment, except that a print unit 220 and a scan unit 330 are removably mounted in the combined machine. That is, the print unit 220 and the scan unit 230 are mounted in the combined machine 100, and are detachably connected to each other by a connecting unit 250. A scan recess 170 is further provided to park the scan unit 230 when the scan unit 230 and the print unit 220 are not connected.

Referring to FIG. 5, the print unit 220 has a head moving body 223 and a recording head 125. According to one aspect, the recording head 125 is an ink jet head 125. The head moving body 223 receives the ink jet head 125, and is moved along the Y axis by a transfer unit. The transfer unit has the belt 114, to which the head moving body 223 is secured, the guide rod 112, to guide the head moving body 223, and a motor 116 to move the belt 114. There are end pulleys 115 provided at ends of the belt 114 and one end pulley 115 is connected to the motor 116. The guide rod 112 extends along the Y axis (see FIG. 2) of the combined machine 100 (see FIG. 2), and allows the head moving body 223 to be stably moved by the belt 114.

The scan unit 230 has the scan module 131 to read a content of the first paper 101, and a frame 233 supporting the scan module 131. Since the construction and the operation of the scan module 131 are similar to that of the first embodiment, descriptions will be omitted.

The connecting unit 250 has an electromagnet 251 and an adsorption plate 253. The electromagnet 251 is mounted on a top of the head moving body 223 of the print unit 220. The adsorption plate 253 is mounted on a bottom of the frame 233 of the scan unit 230. According to one aspect, the adsorption plate 253 is an iron plate, or the like, which is strongly attracted to the electromagnet 251. A magnetic force of the electromagnet 251 is sufficient to prevent the scan unit 230 from being separated or shaken when the print unit 220 is moved by the transfer unit. Although the electromagnet 251 is mounted on the head moving body 223 of the print unit 220, and the adsorption plate 253 is mounted in the frame 233 of the scan unit 230, according to one aspect, it is possible to position them oppositely as a matter of convenience.

The scan unit 230 is parked in the scan recess 170, which is provided at an end of the transfer unit inside the frame 233 of the combined machine 100. The shape of the scan recess 170 stably supports the scan unit 230 and guides the scan unit 230 to connect to the print unit 220 by the connecting unit 250.

According to one aspect, the combined machine 100 additionally has a sensor (not shown), to detect whether or not the print unit 220 and the scan unit 230 are connected. Accordingly, the sensor prevents malfunction of the combined machine 100 during the scanning and the printing, because the scanning and the printing are performed after the sensor detects whether the print unit 220 and the scan unit 230 are connected . According to one aspect, the sensor senses an electromagnetic interference. According to another aspect, the sensor uses a contact between the print unit 220 and the scan unit 230. Further, any type of sensor can be adopted if the sensor can detect whether the print unit 220 and the scan unit 230 are connected and if the sensor can correspond to the construction of the print unit 220, the scan unit 230 and the connecting unit 250.

Below is a description of the operation of the second embodiment of the combined machine 100.

When the combined machine 100 is used as a scanner, the first paper 101 is laid and aligned on the glass plate 150 (see FIG. 2). Then, the belt 114 moves along the Y axis by operation of the motor 116 (see FIG. 5), and the print unit 220, which is secured to the belt 114, moves along the guide rod 112 to the scan recess 170. When the print unit 220 is positioned below the scan unit 230, which is parked in the scan recess 170, electric power is applied to the electromagnet 251. When the electromagnet 251 is magnetized, the adsorption plate 253 of the scan unit 230 adheres to the electromagnet 251 of the print unit 220, so that the scan unit 230 and the print unit 220 are united (see FIG. 6). Thereafter, when the print unit 220 is moved along the guide rod 112 by the belt 114, the scan module 131 of the scan unit 230 reads a content of the first paper 101 on the glass plate 150.

When using the combined machine 100 to print, the paper loading section 161 (see FIG. 2) is first loaded with the second paper 102. The second paper 102 is separated into individual sheets 102 by the pickup roller 164 (see FIG. 4), and fed between the print unit 220 and the paper guide 109 (see FIG. 4) by the feed roller 166 (see FIG. 4). When the print unit 220 is united with the scan unit 230 by the connecting unit 250, the motor 116 rotates and moves the belt 114, and the print unit 220 moves toward the scan recess 170. When the print unit 220 is positioned below the scan recess 170, the scan unit 230 is parked in the scan recess 170. Then, the electric power of the electromagnet 251 is cut off, and the electromagnet 251 loses magnetic force. When the electromagnet 251 loses magnetic force, the scan unit 230 and the print unit 220 are separated. Following this, the belt 114 is moved by the motor 116 and the print unit 220 ejects ink from the ink jet head 125 while moving along the guide rod 112, thereby printing an image on the second paper 102. When the printing of the second paper 102 is completed, the second paper 102 is discharged to the outside by the paper discharging section 140 (see FIG. 4).

In the second embodiment, as described above, only the print unit 220 moves during the printing of the second paper 102, since the print unit 220 alone is lighter than the print unit 220 united with the scan unit 230. Accordingly, a moving load on the moving unit is lessened. Also, since the print unit 220 reaches a proper moving speed within a short time, a length of the guide rod is reduced, resulting in a reduced width of the combined machine 100.

Figure 7:
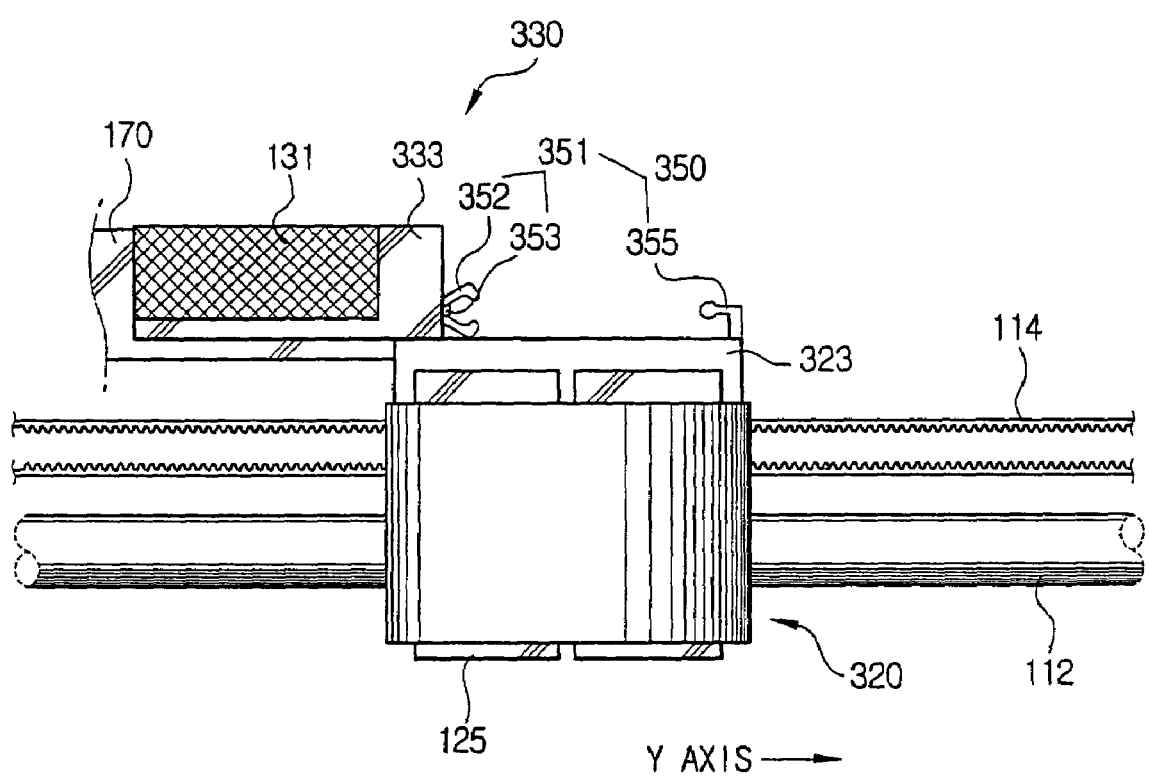
FIG. 7 is a schematic view of the combined flat bed scanner/printer machine according to a third embodiment of the present invention.
Figure 8:
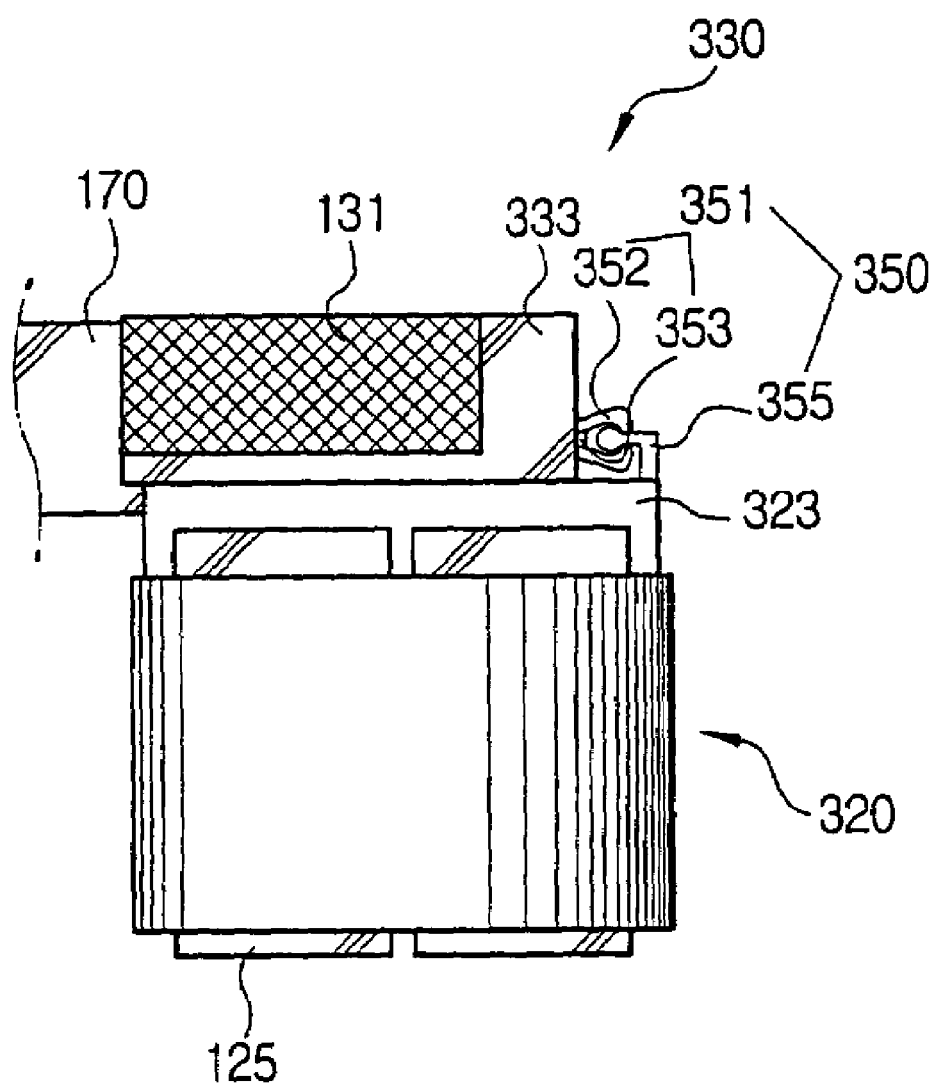
FIG. 8 is a schematic view showing the scan unit and the recording head integrated with each other in the combined flat bed scanner/printer machine of FIG. 7.

FIGS. 7 and 8 show the print unit and the scan unit of the combined machine 100 according to a third embodiment. The general construction of the third embodiment of the combined machine 100 is substantially similar to the second embodiment, except for a connecting unit 350. Accordingly, the following is only a description of the construction and operation of the connecting unit of the third embodiment.

Referring to FIG. 7, the connecting unit 350 has a toggle latch 351 provided on a scan unit 330, and a locking projection 355 disposed on a print unit 320.

The toggle latch 351 protrudes from a side of the scan unit 330. Further, the toggle latch 351 has an actuating part 353 and a pair of arms 352, such that when the actuating part 353 is pressed, the arms 352 lock, and when the actuating part 353 is re-pressed, the arms 352 open. Because the toggle latch 351 is generally used and well known in the art, a detailed construction thereof is not described. With respect to the parts identical to those of the second embodiment, like reference numerals are assigned in FIGS. 7 and 8.

The locking projection 355 is clamped by the arms 352 of the toggle latch 351 when the locking projection 355 presses the actuating part 353. The locking projection 355 is mounted on a top a head moving body 323 of the print unit 320 to correspond with the toggle latch 351 mounted on the scan unit 330.

Although the toggle latch 351 is provided on the scan unit 330 and the locking projection 355 is provided on the print unit 320 in this embodiment, according to one aspect, they can be provided in the opposite positions as a matter of convenience. Also, various modified embodiments can be suggested. For example, according to one aspect, the combined machine 100 additionally has a sensor (not shown) detecting whether or not the print unit 320 and the scan unit 330 are connected.

To scan the first paper 101, the scan unit 330 is engaged to the print unit 320 in the following manner. First, the print unit 320 is moved toward the scan recess 170 as the belt 114 is turned by the motor 116 (see FIG. 5). Then the locking projection 355 presses the actuating part 353 of the toggle latch 351 when the print unit 320 is positioned below the scan unit 330. When the toggle latch 351 is pressed by the locking projection 355, the arms 352 clamp the locking projection 355. In this state, when the print unit 320 is moved by the belt 114, the print unit 320 and the scan unit 330 move as a single unit, as shown in FIG. 8.

The scan unit 330 and the print unit 320 are separated in the following manner to perform the print operation after the scan operation. First, the print unit 320 united with the scan unit 330 is moved toward the scan recess 170 by the belt 114. If the print unit 320 is urged against the scan recess 170 once the scan unit 330 is parked in the scan recess 170, the print unit 320 is pressed further against the scan recess 170, and the actuating part 353 of the toggle latch 351 is pressed by the locking projection 355 of the print unit 320. Then, the arms 352 of the toggle latch 351 open, and the locking projection 355 can move free of the toggle latch 351. Then, when the print unit 320 moves, the scan unit 330 remains parked in the scan recess 170.

Hereinafter, the combined machine 100 according to a fourth embodiment is described. The general construction of the fourth embodiment of the combined machine 100 is substantially similar to the second and the third embodiments, except for a connecting unit 450. Accordingly, with respect to parts identical to those of the second and the third embodiments, like reference numerals will be assigned and their descriptions will be omitted.

Figure 9:
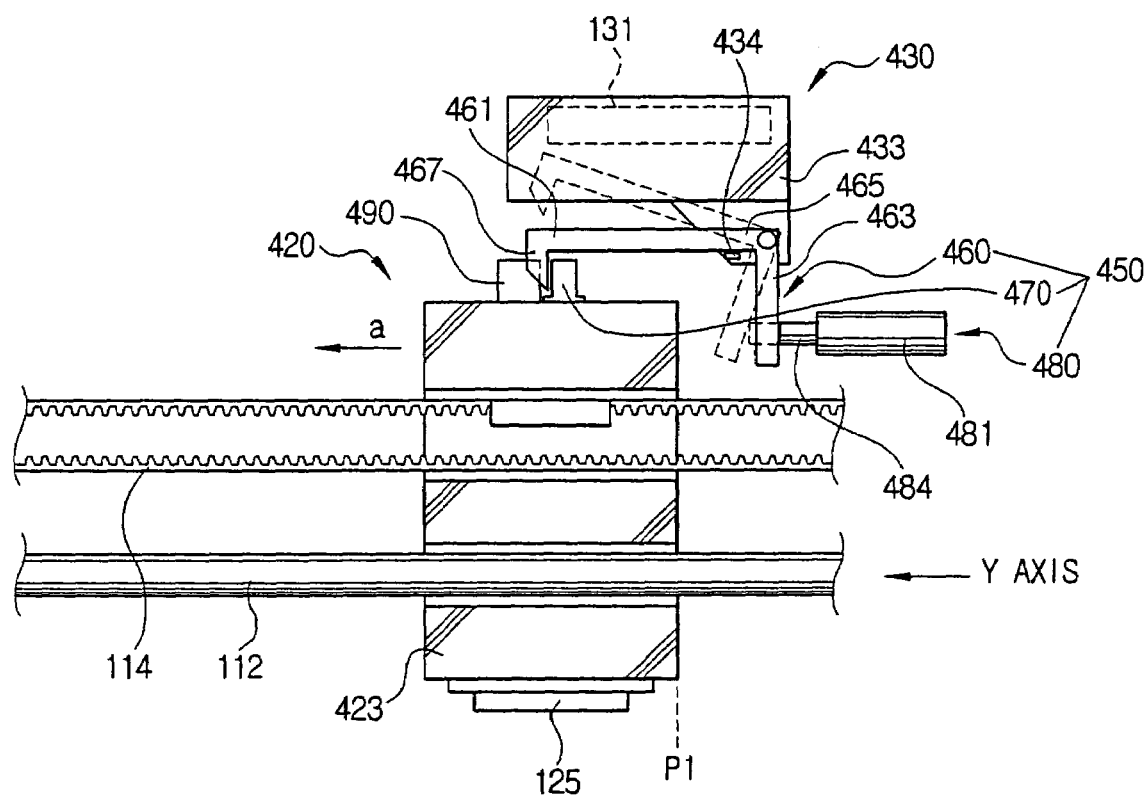
FIG. 9 is a schematic view showing an interior of the combined flat bed scanner/printer machine on a standby mode according to a fourth embodiment of the present invention.
Figure 10:
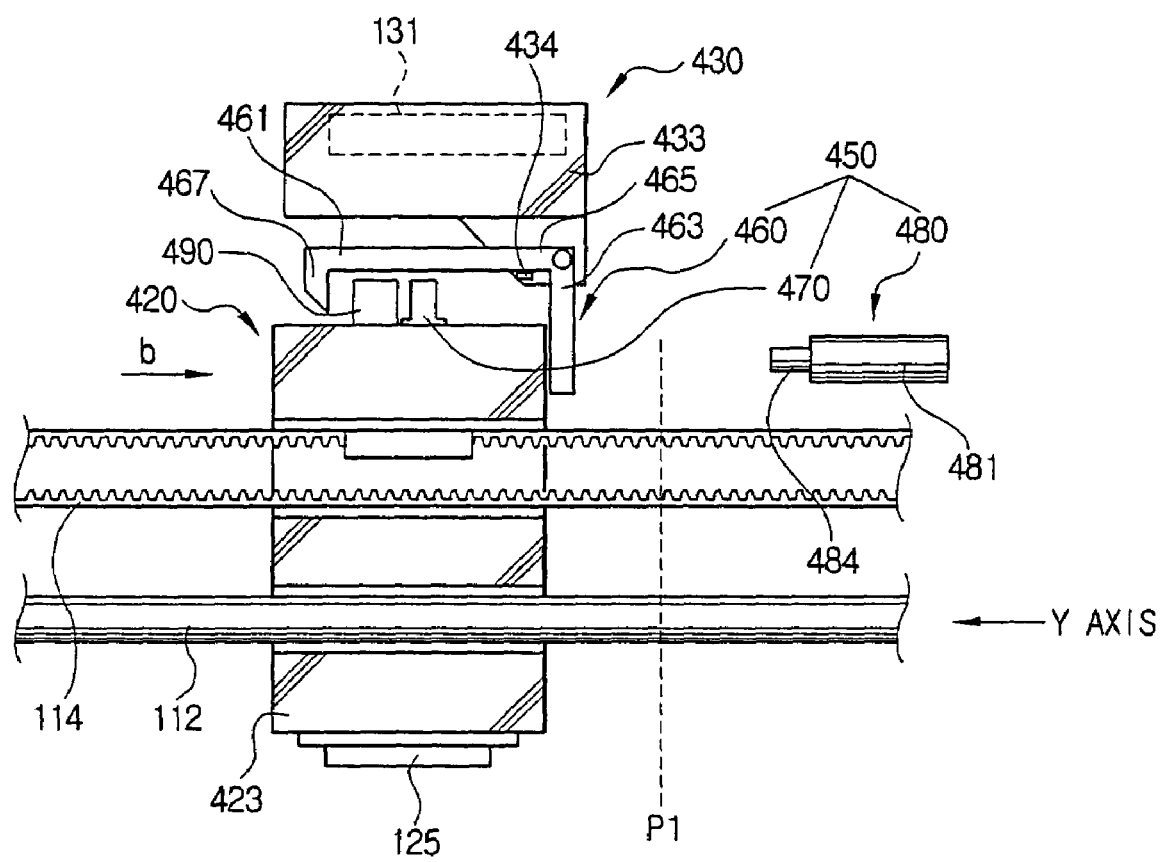
FIG. 10 is a view showing the head moving body and the scan unit of FIG. 9 in a moving state.

Referring to FIGS. 9 and 10, a scan unit 430 of the combined machine 100 according to the fourth embodiment has a scan module 131 and a frame 433 for supporting the scan module 131. Since the scan module 131 is similar to that of the above-described embodiments, a detailed description is omitted. Meanwhile, the frame 433 is mounted in the combined machine 100, and is capable of moving along the Y axis as shown in FIG. 3. The body 110 of the combined machine 100 is provided with various guides such as a guide rail and the guide rod 112, to guide the movement of the frame 433.

The print unit 420 has a head moving body 423 and a recording head 125. According to one aspect, the recording head 125 is an ink jet head 125. The head moving body 423 supports the ink jet head 125, and is mounted inside the body 110 of the combined machine 100, and reciprocates along the Y axis (see FIG. 3) by a transfer unit. In this embodiment, the head moving body 423 moves both in a first direction (a) away from an initial position P1, at which the head moving body 423 is positioned for a standby mode of the combined machine 100, and a second direction (b) opposite to the first direction (a). When the head moving body 423 moves in the second direction (b) to print, the head moving body 423 moves up to a switching position P2 (see FIG. 12) to operate a moving switch 480.

The transfer unit has the belt 114, to which the head moving body 423 is secured, the guide rod 112 guiding the head moving body 423 as moved by the belt 114, and a motor 116 (see FIG. 5) operating the belt 114. Since the transfer unit is substantially similar to that of a general ink jet printer, a detailed description thereof is omitted.

The connecting unit 450 has a pivoting member 460, a latching projection 470, and the moving switch 480.

The pivoting member 460 is pivotably disposed on a lower end of the frame 433 adjacent to the head moving body 423 and is "L" shaped. That is, the pivoting member 460 has a first part 461, a second part 463, and a corner 465. The first part 461 is positioned above the head moving body 423, and has a hook 467 positioned on an end thereof. The hook 467 is selectively engaged with the latching projection 470 positioned on a top of the head moving body 423, when the pivoting member 460 pivots. The second part 463 is positioned between a sidewall of the head moving body 423 and the moving switch 480 when the head moving body 423 is positioned at the initial position P1. The corner 465 connects the first and the second parts 461 and 463 with a predetermined angle set therebetween, and is hinged on the lower end of the frame 433.

When the pivoting member 460 having the above construction pivots, and the hook 467 is engaged with the latching projection 470, the head moving body 423 and the frame 433 move concurrently in the first direction (a), as shown in FIG. 9. And, when the head moving body 423 moves in the direction (b), as shown in FIG. 10, the second part 463 of the pivoting member 460 contacts the sidewall of the head moving body 423, so that the head moving body 423 and the frame 433 move concurrently.

According to one aspect, the frame 433 is provided with a protrusion 434 positioned on a side thereof. When the head moving body 423 moves in the second direction (b), the protrusion 434 prevents the disconnection of the head moving body 423 and the frame 433, which occurs when the pivoting member 460 pivots more than a predetermined angle.

The moving switch 480 is disposed on a conveyance path of the head moving body 423. The moving switch 480 pivots the pivoting member 460 to engage the hook 467 with the latching projection 470 to scan the first paper 101, and pivots the pivoting member 460 to release the engagement of the hook 467 and the locking projection 470 to print the second paper 102. According to one aspect, the moving switch 480 is a motor switch using a solenoid.

Figure 11:
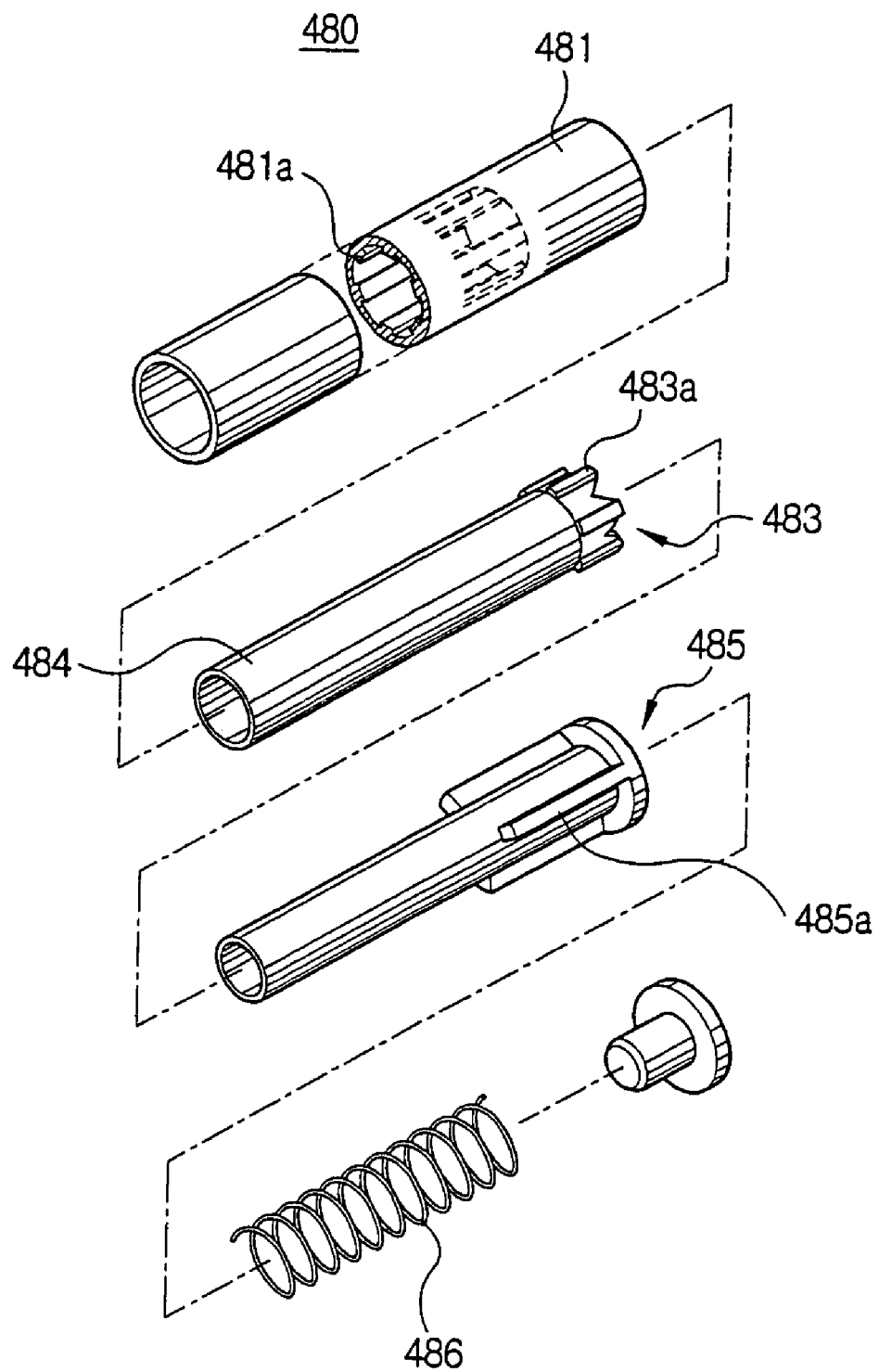
FIG. 11 is an exploded perspective view showing the moving switch of FIG. 9.

FIG. 11 shows the moving switch 480 according to another aspect. Referring to FIG. 11, the moving switch 480 has a switch body 481, a first slider 483 having a moving rod 484, a second slider 485, and a spring 486. The moving switch 480 is similar to a general push switch, in that it has a first guide protrusion 481a protruding from an inner circumference of the switch body 481, a second guide protrusion 483a protruding from the first slider 483, a third guide protrusion 485a protruding from the second slider 485, and the spring 486. Accordingly, when the moving rod 484 is compressed/decompressed by the interaction among the first guide protrusion 481a, the second guide protrusion 483a, the third guide protrusion 485a, and the spring 486, a protruding length of the driving switch 480 is changed. The following is a detailed description of operation of the moving switch 480.

When the head moving body 423 is moved to the switching position P2 (see FIG. 12), the moving rod 484 is contact-compressed by the pivoting member 460, and resiliently inserted into the switch body 481. In this state, when the head moving body 423 moves in the first direction (a), the moving rod 484 pops-out of the switch body 481 a predetermined distance by a resilient recovering force of the spring 486 disposed inside the switch body 481. A position of an end of the moving rod 484 varies as the moving rode 484 is pushed in/pulled out. That is, the protruding length of the moving rod 484 is varied as the moving rod 484 contacts with the pivoting member 460, and is separated from the pivoting member 460, to thus have the end alternately positioned between a first position P3 (see FIG. 13) and a second position P4 (see FIG. 13). At the first position P3, the moving rod 484 supports the pivoting member 460 to engage the hook 467 with the latching projection 470, and at the second position P4, the moving rod 484 pivots the pivoting member 460 to disengage the hook 467 from the latching projection 470. The operation of the moving switch 480 as described above is shown in FIGS. 12 and 13.

When using the moving switch 480 constructed as above, it is possible to pivot the pivoting member 460 by movement of the head moving body 423, without having to use the motor switch using the solenoid. Accordingly, connection/disconnection of the print unit 420 and the scan unit 430 can be implemented by simple mechanical construction, and since there is no motor switch, it is not necessary to design a control flow to control the motor switch.

According to one aspect, the combined machine 100 additionally has a sensor 490 detecting a position of the pivoting member 460 prior to scan/print operations, thereby preventing malfunction of the combined machine 100. The sensor 490 of this embodiment detects a position of the hook 467 by light detection. That is, the sensor 490 monitors whether or not the hook 467 and the latching projection 470 are engaged with each other, by detecting a light interference that occurs due to the hook 467 descending and engaging with the locking projection 470. For this, the sensor 490 is disposed on the top of the head moving body 423 adjacent to the latching projection 470.

Reference will now be made to operation of the combined machine constructed as above, according to the fourth embodiment, with reference to FIGS. 9-13.

FIG. 9 shows the head moving body 423 positioned at the initial position P1 for the standby mode prior to the print/scanning. The hook 467 of the pivoting member 460 is engaged with the latching projection 470.

When a scanning operation of the first paper 101 is commanded by a user's selection, the sensor 490 determines whether the hook 467 and the latching projection 470 are engaged, and if so, the belt 114 is moved by the motor 116 (see FIG. 5). As the belt 114 moves, the head moving body 423 reciprocates in the first and the second directions (a) and (b) together with the frame 433. The movement of the frame 433 in the first direction (a) is accomplished by the contact of the hook 467 and the latching projection 470, as shown in FIG. 9. Whereas, the movement of the frame 433 in the second direction (b) is accomplished by the contact of the second part 463 of the pivoting member 460 and the sidewall of the head moving body 423, as shown in FIG. 10.

When the scanning operation is completed, the head moving body 423 returns to the initial position P1 for the standby mode, as shown in FIG. 9.

Figure 12:
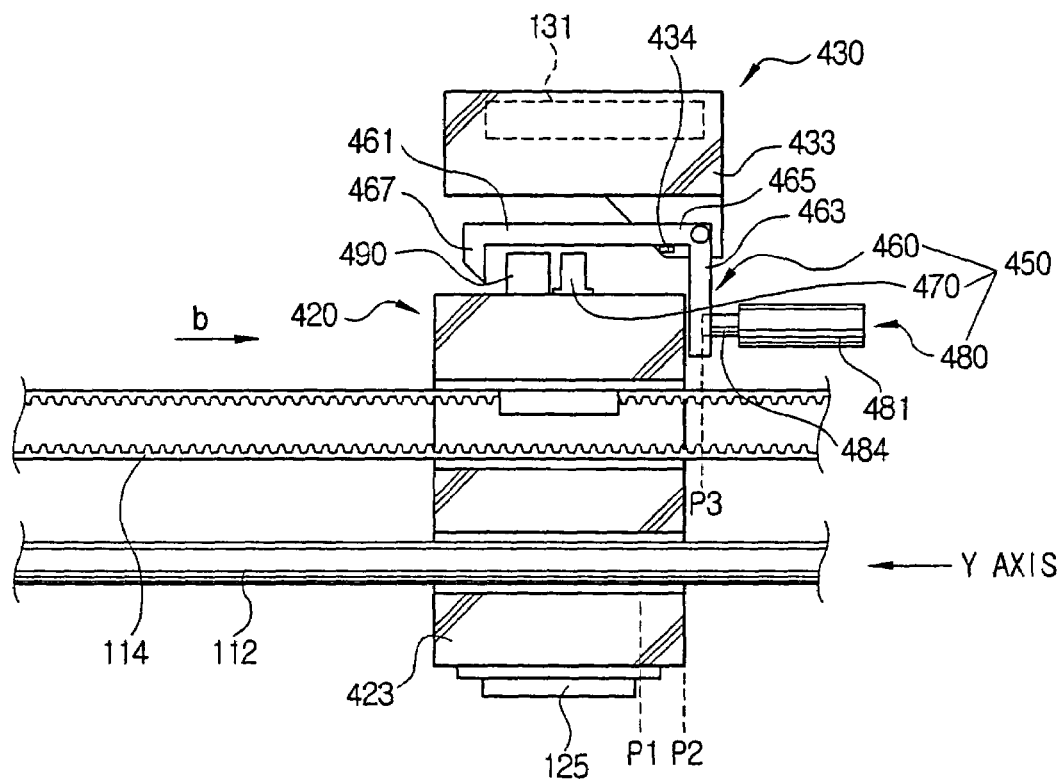
FIGS. 12 and 13 are schematic views of the sequential operations of the combined flat bed scanner/printer machine of FIG. 9.
Figure 13:
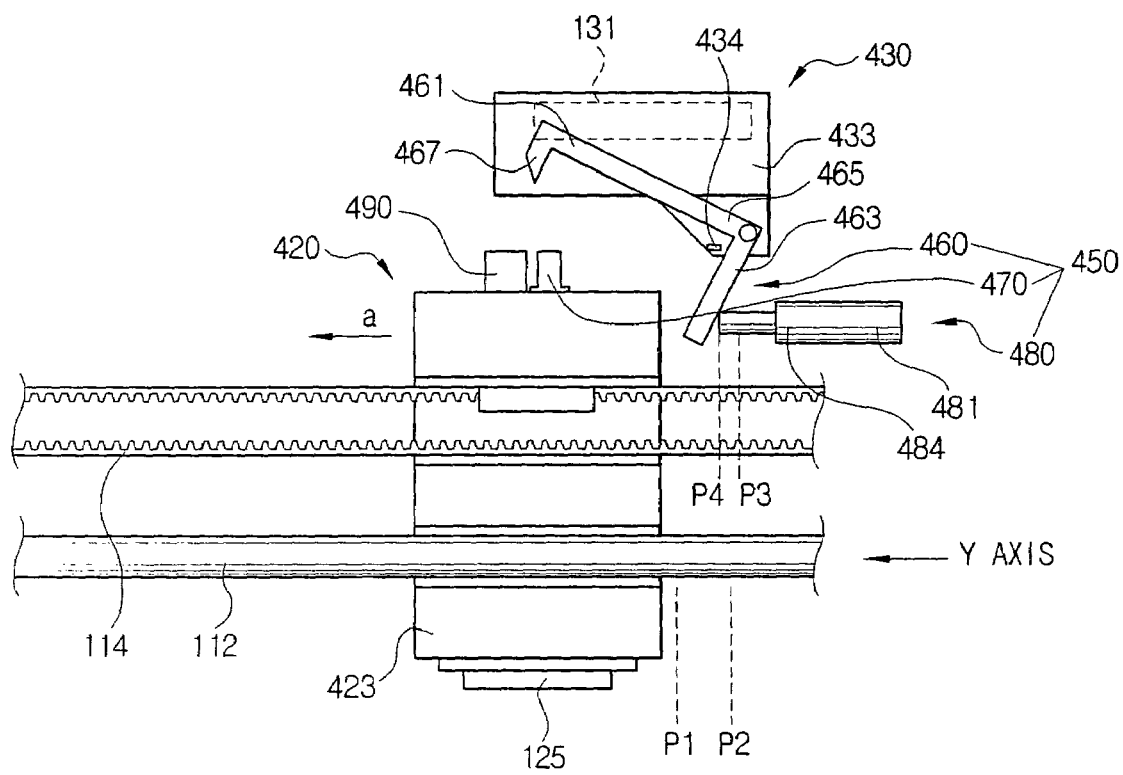

When a printing command with respect to the second paper 102 is input by the user's selection, the head moving body 423 is moved to the switching position P2, as shown in FIG. 12. Then, the second part 463 of the pivoting member 460, moved by the side of the head moving body 423, compresses the moving rod 484 of the moving switch 480, and inserts the moving rod 484 into the switch body 481. Thereafter, the head moving body 423 is moved in the first direction (a) to return to the initial position P1. As the head moving body 423 returns to the initial position P1, the moving rod 474 is decompressed, and resiliently pops-out of the switch body 481, so that the end of the moving rod 484 is positioned at the second position P4, as shown in FIG. 13.

Accordingly, the pivoting member 460 pivots to release the engagement of the hook 467 and the locking projection 470.

When the sensor 490 detects the pivotal movement of the pivoting member 460, the head moving body 423 moves in the first and the second directions (a) and (b), thereby performing a printing with respect to the second paper 102. When the printing is completed, the head moving body 423 returns to the initial position P1. At this time, the head moving body 423 may move to the switching position P2, to operate the moving switch so that the end of the moving rod 484 is positioned at the first position P3, and then, return to the initial position P1. Accordingly, the pivoting member 460 pivots and engages the hook 467 with the latching projection 470, so that the head moving body 423 is in the standby mode at the initial position P1, in which the print unit 420 and the scan unit 430 are combined.

Although the various types of connecting units 250, 350, and 450, are described in the second, third, and fourth embodiments, respectively, this should not be considered as limiting. Any type of connecting unit can be used if it selectively connects the head moving body 223, 323, 423 and the frame 233, 333, 433. Further, the sensor 490 can be modified according the connection manner of the head moving body 223, 323, 423 and the frame 233, 333, 433.

In the fourth embodiment, if the sensor 490 detects inaccurate engagement/disengagement of the hook 467 and the latching projection 470, various modifications can be suggested to solve the problem. For example, according to one aspect, the head moving body 423 is moved to the switching position P2 to re-operate the moving switch 480. According to another aspect, an external display device (not shown) displays the malfunction of the machine.

As described above, the combined machine 100 does not require separate devices to operate the scan module and the print module, e.g., separate belts, pulleys, motors, guide rods, and the like which have been used to operate the scan module and print module in the conventional combined machine. Also, since the height of the machine is reduced, the space utilization is enhanced. In particular, since the print unit and the scan unit can be selectively engaged with each other, it is possible to reduce the load applied to the print unit and also reduce the width of the machine.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A combined flat bed scanner/printer machine comprising:
 a moving body that is movable;
 a scan unit, moved by the moving body to scan a first paper;
 a transfer unit, to move the moving body, the transfer unit having a belt, attached to the moving body, a motor, to move the belt, and a guide rod to guide the moving body; and
 a print unit, moved by the moving body to print on a second paper.

2. The machine according to claim 1, wherein the print unit is an ink jet head.

3. The machine according to claim 1, wherein scanning and printing occur simultaneously.

4. The machine according to claim 1, wherein the scan unit and the print unit are mounted on the moving body.

5. The machine according to claim 1, further comprising:
 a plurality of pulleys to move the moving body along the guide rod, wherein
  one of the plurality of pulleys is located at an end of the transfer unit and is in communication with the belt, and
  one of the plurality of pulleys is located at the motor and is in communication with the belt.

6. The machine according to claim 1, further comprising:
 a connecting unit,
 wherein the print unit and the scan unit are selectively connected to each other by the connecting unit.

7. A combined flat bed scanner/printer machine comprising:
 a moving body that is movable;
 a scan unit, moved by the moving body to scan a first paper;
 a print unit, moved by the moving body to print on a second paper;
 a connecting unit; and
 a scan recess, located at an end of the machine and shaped to park the scan unit when the scan unit is not mounted on the moving body,
 wherein
  the print unit is mounted on the moving body, and
  the scan unit is selectively mounted on the moving body by the connecting unit to scan the first paper.

8. The machine according to claim 7, wherein:
 the scan unit is not moved by the moving body during printing.

9. A combined flat bed scanner/printer machine comprising:
 a moving body that is movable;
 a scan unit, moved by the moving body to scan a first paper;
 a print unit, moved by the moving body to print on a second paper; and
 a connecting unit,
 wherein the print unit is mounted on the moving body, and the scan unit is selectively mounted on the moving body by the connecting unit to scan the first paper,
 wherein the connecting unit comprises:
  an electromagnet connected to one of the print unit or the scan unit; and
  an adsorption plate connected to the remaining one of the print unit or the scan unit to correspond to the electromagnet, and
 wherein the adsorption plate adheres to the electromagnet when the electromagnet is magnetized.

10. A combined flat bed scanner/printer machine comprising:
 a moving body that is movable;
 a scan unit, moved by the moving body to scan a first paper;
 a print unit, moved by the moving body to print on a second paper;
 a connecting unit; and
 a sensor determining whether the scan unit is mounted on the moving body,
 wherein the print unit is mounted on the moving body, and the scan unit is selectively mounted on the moving body by the connecting unit to scan the first paper, and
 wherein the moving body starts moving to read the first paper for scanning after it is determined that the scan unit is mounted on the moving body, and the moving body starts moving to print on the second paper after the sensor determines that the scan unit is not mounted on the moving body.

11. The machine according to claim 10, wherein:
the sensor senses an electromagnetic interference to determine whether the scan unit is mounted on the moving body.

12. The machine according to claim 10, wherein:
the sensor uses a contact between the scan unit and the print unit to determine whether the scan unit is mounted on the moving body.

13. A combined flat bed scanner/printer machine comprising:
a moving body that is movable;
a scan unit, moved by the moving body to scan a first paper;
a print unit, moved by the moving body to print on a second paper; and
a connecting unit,
wherein the print unit is mounted on the moving body, and the scan unit is selectively mounted on the moving body by the connecting unit to scan the first paper, and
wherein the connecting unit comprises:
a toggle latch connected to one of the print unit or the scan unit; and
a locking projection connected to the remaining one of the print unit or the scan unit, wherein the toggle latch is opened when the print unit and the scan unit are not connected, and the toggle latch is closed around the locking projection when the print unit and the scan unit are connected.

14. The machine according to claim 13, wherein the toggle latch comprises:
an actuating part; and
arms,
wherein when the actuating part is pressed, the arms lock, and when the actuating part is re-pressed, the arms open.

15. The machine according to claim 14, wherein:
when the locking projection presses the actuating part, the arms lock around the locking projection.

16. The machine according to claim 7, wherein the connecting unit comprises:
a latching projection protruding from one of the moving body or the scan unit;
a pivoting member pivotably disposed on the remaining one of the moving body or the scan unit, and having a hook to selectively engage the latching projection when the pivoting member pivots; and
a moving unit disposed on a conveyance path of the moving body and pivoting the pivoting member to disengage the hook from the latching projection to print on the second paper.

17. The machine according to claim 16, further comprising:
a frame to support the scan unit; and
a guide, to guide movement of the frame.

18. The machine according to claim 17, wherein:
the pivoting member is pivotably disposed on the frame; and
the pivoting member has;
a first part positioned adjacent to the moving body, and having the hook positioned on an end thereof;
a second part disposed between the moving body and the moving unit; and
a corner pivotably disposed on the scan unit, and connecting the first and the second parts with a predetermined angle therebetween.

19. The machine according to claim 18, wherein the frame comprises:
a protrusion that contacts the pivoting member to confine the movement of the pivoting member to a predetermined pivoting range.

20. The machine according to claim 18, wherein:
when the hook and the latching projection are engaged and the moving body is moved in a first direction, the scan unit is moved together with the moving body as a single unit; and
when the hook and the latching projection are not engaged and the moving body is moved in a second direction opposite to the first direction, the second part of the pivoting member contacts a side of the moving body so that the pivoting member pivots, the hook engages the latching body, and the scanning unit is moved together with the moving body as a single unit.

21. The machine according to claim 18, wherein the moving unit comprises:
a switch body; and
a moving rod protruding from the switch body,
wherein when the moving body is moved to an end of the conveyance path, the moving rod is selectively moved from a first position, in which the moving rod supports the pivoting member to engage the hook with the latching projection, to a second position, in which the moving rod pivots the pivoting member to disengage the hook from the latching projection.

22. The machine according to claim 16, wherein the moving unit comprises:
a motor switch using a solenoid.

23. The machine according to claim 16, further comprising:
a sensor determining whether the scan unit is mounted on the moving body,
wherein the moving body starts moving to read the first paper for scanning after it is determined that the scan unit is mounted on the moving body, and the moving body starts moving to print on the second paper after the sensor determines that the scan unit is not mounted on the moving body.

24. The machine according to claim 23, wherein:
the sensor senses a position of the hook by light detection.

25. The machine according to claim 24, wherein:
the sensor is disposed adjacent to the latching projection.

26. The machine according to claim 25, wherein:
when the hook is not engaged with the locking projection, the sensor senses a light; and
when the hook engages the locking projection, the hook interferes with the light, and the sensor detects the interference with the light.

27. The machine according to claim 23, wherein:
one of
when the hook and the latching projection are supposed to be engaged and the sensor determines an inaccurate engagement, or
when the hook and the latching projection are supposed to be disengaged and the sensor determines an inaccurate disengagement,
the moving unit is moved to the second position.

28. The machine according to claim 23, wherein:
one of
  when the hook and the latching projection are supposed to be engaged and the sensor determines an inaccurate engagement, or
  when the hook and the latching projection are supposed to be disengaged and the sensor determines an inaccurate disengagement,
an external display device displays a malfunction.

29. The machine according to claim 16, wherein:
after the print unit prints on the second paper, the scan unit is mounted on the moving body.

30. The machine according to claim 1, wherein the scan unit comprises:
  a line scanner having a plurality of image sensors.

31. The machine according to claim 30, wherein the plurality of image sensors comprise:
  charge coupled devices.

32. The machine according to claim 30, wherein the plurality of image sensors comprise:
  contact image sensors.

* * * * *

UNITED STATES PATENT AND TRADEMARK OFFICE
CERTIFICATE OF CORRECTION

PATENT NO. : 7,310,161 B2 Page 1 of 1
APPLICATION NO. : 10/671610
DATED : December 18, 2007
INVENTOR(S) : Sung-wook Kang et al.

It is certified that error appears in the above-identified patent and that said Letters Patent is hereby corrected as shown below:

Column 13, Line 61, change "has;" to --has:--.

Signed and Sealed this

Third Day of June, 2008

JON W. DUDAS
*Director of the United States Patent and Trademark Office*